(12) United States Patent
Polyakov et al.

(10) Patent No.: US 11,022,538 B2
(45) Date of Patent: Jun. 1, 2021

(54) QUANTUM FLOW CYTOMETER

(71) Applicant: Government of the United States of America, as represented by the Secretary of Commerce, Gaithersburg, MD (US)

(72) Inventors: Sergey V. Polyakov, Gaithersburg, MD (US); Ivan A. Burenkov, Germantown, MD (US); Yu-Hsiang Cheng, North Brunswick, NJ (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/413,078

(22) Filed: May 15, 2019

(65) Prior Publication Data
US 2019/0353578 A1 Nov. 21, 2019

Related U.S. Application Data

(60) Provisional application No. 62/671,907, filed on May 15, 2018.

(51) Int. Cl.
*G01N 15/14* (2006.01)
(52) U.S. Cl.
CPC . *G01N 15/1434* (2013.01); *G01N 2015/1454* (2013.01)

(58) Field of Classification Search
CPC ... G01N 2015/1006; G01N 2015/1454; G01N 15/1459; G01N 15/1434; G01N 15/1436; G01N 15/1411; G01N 15/14; G01N 15/1404; G01N 15/1409
See application file for complete search history.

(56) References Cited

U.S. PATENT DOCUMENTS 6,133,995 A * 10/2000 Kubota .............. G01N 15/1459
356/337
6,139,800 A * 10/2000 Chandler ............. G01N 21/645
356/72

(Continued)

*Primary Examiner* — Sang H Nguyen
(74) *Attorney, Agent, or Firm* — Office of Chief Counsel for National Institute of Standards and Technology

(57) ABSTRACT

A quantum flow cytometer detects an analyte with photon-number statistics and includes: a flow cytometer that receives a pump light, an analyte and produces scattered light from the analyte; an intensity interferometer that includes a beam splitter and receives the scattered light; splits the scattered light; and single photon detectors that receive the scattered light, such that the beam splitter and the single photon detectors provide photon number statistics that detects the analyte. A process for detecting the analyte with photon-number statistics includes: receiving the pump light; producing, by the analyte, scattered light from scattering the pump light; splitting the scattered light into first scattered light and second scattered light; detecting, by single photon detectors, the first scattered light and second scattered light; producing, by the single photon detectors, detection signals; and subjecting the detection signals to an analyzer to detect the analyte by photon number statistics.

16 Claims, 7 Drawing Sheets

(56) References Cited

U.S. PATENT DOCUMENTS

| | | | | |
|---|---|---|---|---|
| 6,228,652 B1* | 5/2001 | Rodriguez | ............ | G01N 15/14 |
| | | | | 356/335 |
| 6,507,391 B2* | 1/2003 | Riley | ................ | G01N 15/1012 |
| | | | | 356/28 |
| 7,630,063 B2* | 12/2009 | Padmanabhan | .... | G01N 15/1484 |
| | | | | 356/246 |
| 2002/0028434 A1* | 3/2002 | Goix | ................. | G01N 15/1404 |
| | | | | 435/4 |
| 2009/0323061 A1* | 12/2009 | Novotny | ........... | G01N 15/1456 |
| | | | | 356/336 |
| 2012/0122084 A1* | 5/2012 | Wagner | ............... | G01N 15/147 |
| | | | | 435/6.1 |
| 2012/0129190 A1* | 5/2012 | Chiu | ................. | G01N 33/5302 |
| | | | | 435/7.23 |
| 2013/0126755 A1* | 5/2013 | Kemnitz | ........... | G01N 21/6456 |
| | | | | 250/459.1 |
| 2015/0049333 A1* | 2/2015 | Gourley | ............ | G01N 21/6428 |
| | | | | 356/338 |
| 2016/0178518 A1* | 6/2016 | Schwabe | ........... | G01N 15/1459 |
| | | | | 422/82.08 |
| 2017/0248508 A1* | 8/2017 | Ward | ................ | G01N 15/1404 |

* cited by examiner

QUANTUM FLOW CYTOMETER

CROSS REFERENCE TO RELATED APPLICATIONS

The application claims priority to U.S. Provisional Patent Application Ser. No. 62/671,907 filed May 15, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Cooperative Agreement No. 70NANB16H168 awarded by United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 18-031US1.

BRIEF DESCRIPTION

Disclosed is a quantum flow cytometer for detecting an analyte with photon-number statistics, the quantum flow cytometer comprising: a flow cytometer that: receives a pump light in a first direction; receives an analyte flow comprising the analyte in a second direction; and produces scattered light from scattering the pump light by the analyte; a photon-number resolving detector or an intensity interferometer in optical communication with the flow cytometer and that comprises: a beam splitter in optical communication with the flow cytometer that: receives, in a third direction, the scattered light from the flow cytometer; splits the scattered light into a first scattered light beam and a second scattered light beam; and a first single photon detector in optical communication with the beam splitter and that receives the first scattered light beam from the beam splitter; and a second single photon detector in optical communication with the beam splitter and that receives the second scattered light beam from the beam splitter, such that the beam splitter and the single photon detectors provide a Hanbury Brown-Twiss (HBT) effect that detects the analyte, wherein the first direction, the second direction, and the third direction are arranged at oblique angles.

Disclosed is a process for detecting an analyte with photon-number statistics with the quantum flow cytometer, the process comprising: receiving, by the flow cytometer, the pump light in the first direction; receiving, by the flow cytometer, the analyte flow comprising the analyte in the second direction; producing, by the analyte, scattered light from scattering the pump light; detecting, by the photon-number resolving detector, the scattered light, producing, by the photon-number resolving detector of the detection signal comprising of detection times and detected photon numbers in response to detecting of the optical signal from the detector and subjecting the detection signal to second, third or higher order auto-correlation to detect the analyte or splitting, by the beam splitter, the scattered light into the first scattered light beam and the second scattered light beam; detecting, by the first single photon detectors, the first scattered light beam from the beam splitter; producing, by the first single photon detectors, a first detection signal in response to detecting the first scattered light beam; detecting, by the second single photon detectors, the second scattered light beam from the beam splitter; producing, by the second single photon detectors, a second detection signal in response to detecting the second scattered light beam; wherein a beam splitter can be replaced with a plurality of beam splitters arranged in a binary tree wherein an input to each subsequent beam splitter is in optical communication with an output from a previous beam splitter; and subjecting the first detection signal and the second detection signal to a second, third, or higher order cross-correlation to detect the analyte by the Hanbury Brown-Twiss effect, wherein the first direction, the second direction, and the third direction are arranged at oblique angles.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

Flow cytometry is an optical method to aid diagnosis of health disorders and disease monitoring. It has been discovered that a quantum flow cytometer herein provides optical flow cytometry with photon number statistics determination. Advantageously, the quantum flow cytometer provides an absolute measurement of biomarker concentration and has sensitivity for a single biomarker. Moreover, the quantum flow cytometer provides cell-by-cell discrimination based on a number of biomarkers, e.g., a fluorophore, present in each cell. Unexpectedly, the quantum flow cytometer provides single-biomarker sensitive flow-cytometry and can include cell sorting.

Moreover, the quantum flow cytometer can self-calibrate via an absolute self-calibration and has sensitivity for quantification and enumeration of a single or small number of biological markers per a biological entity such as a cell, peptide, or antigen. The quantum flow cytometer uses a photon-number resolving detector or detector arrangement that resolves photon numbers such as a Hanbury Brown-Twiss (HBT) arrangement that accumulates times-of-arrival and photon number statistics and uses first principles of quantum optics that provide a number of participating emitters. Beneficially, the quantum flow cytometer determines photon number information, detection timestamps, and absolute calibration. At a selected concentration of fluorophores per cell, the quantum flow cytometer accumulates an optical signal from exposures, e.g., from cells, and statistically determines second-, third-, or higher-order correlation functions and their dependence on various time delays. The quantum flow cytometer measures average photon flux as a function of time and time delays and can include measurement for different concentrations. The correlation functions relate to concentrations via characteristics of quantum optics in an absence of prior knowledge of transmittance loss or detection inefficiency in an unknown optical background. An optical flux to moles calibration is obtained from first principles, and dependence of second-, third-, fourth-, or higher-order correlation functions on time provides advantageous signal processing in a sorting mode and enhances signal to noise.

Figure 1:
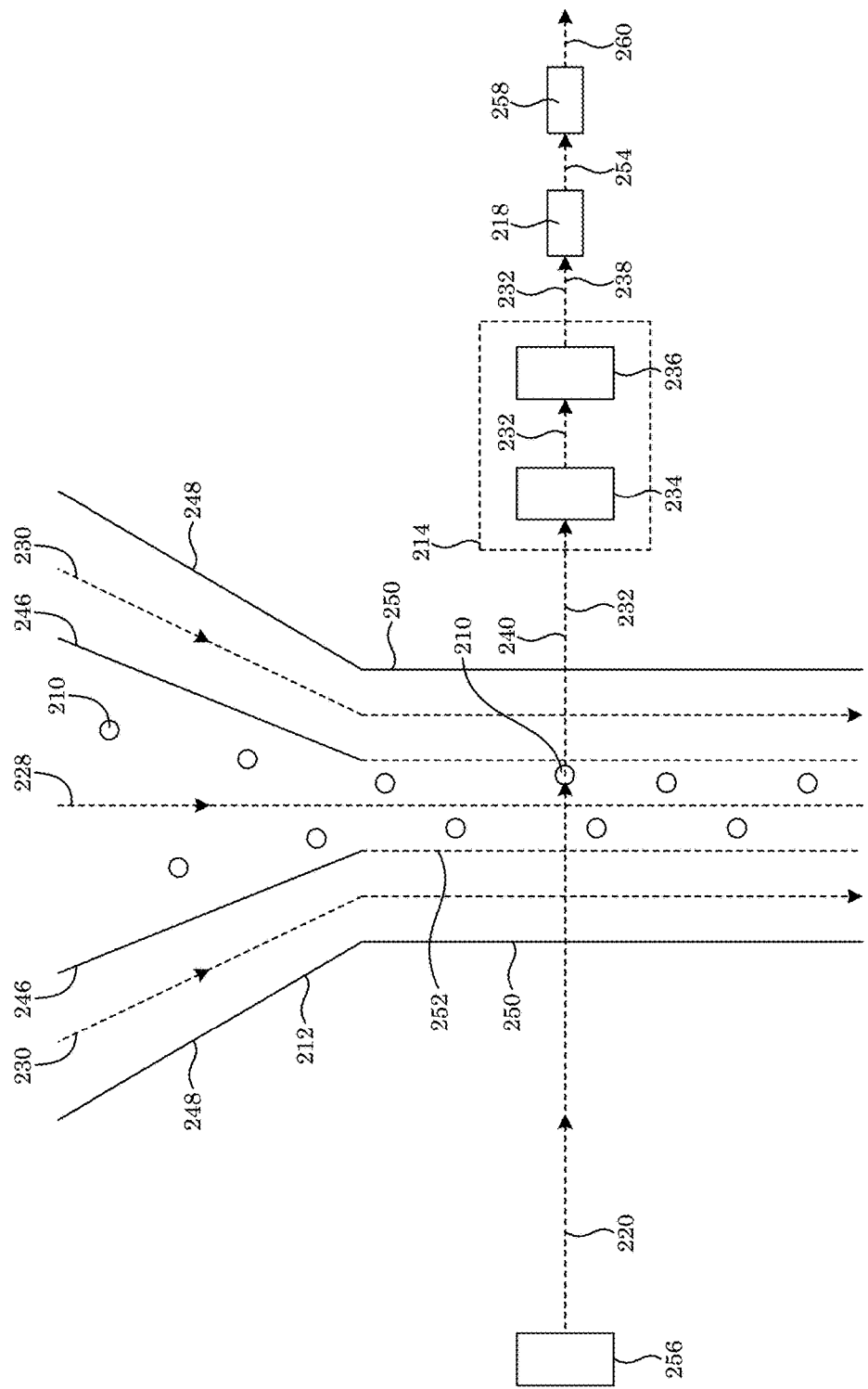
FIG. 1 shows a quantum flow cytometer with a photon-number resolving detector.

Quantum flow cytometer 200 detects analyte 210 with photon-number statistics. In an embodiment, with reference to FIG. 1, quantum flow cytometer 200 includes flow cytometer 212 that receives pump light 220 in first direction 222; receives analyte flow 228 including analyte 210 in second direction 224; and produces scattered light 232 from scattering pump light 220 by analyte 210. Quantum flow cytometer 200 also includes a photon number resolving detector 218 in optical communication with flow cytometer 212 and receives the scattered light beam 232.

Figure 2:
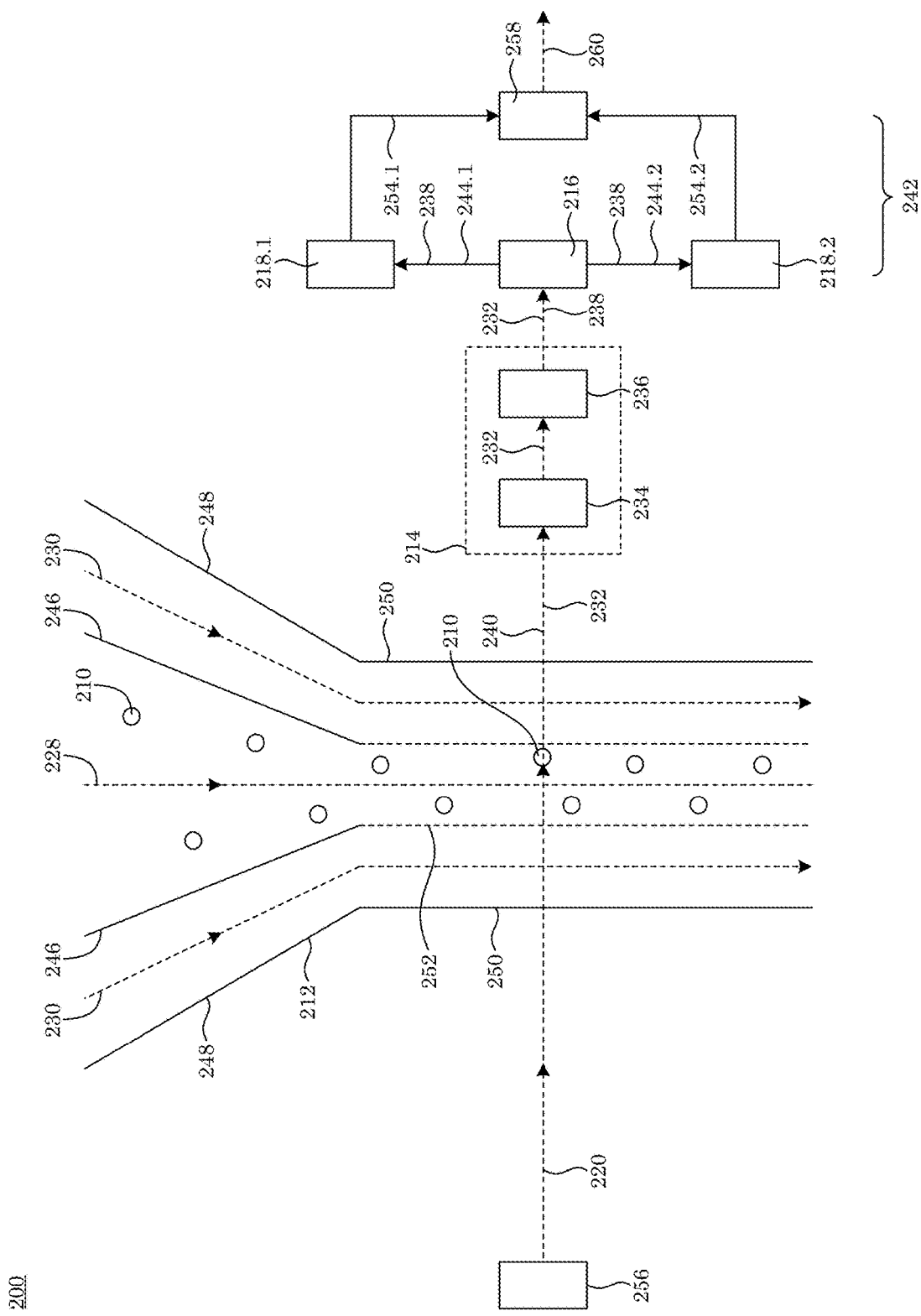
FIG. 2 shows a quantum flow cytometer with a plurality of single-photon detectors in a tree configuration.
Figure 3:
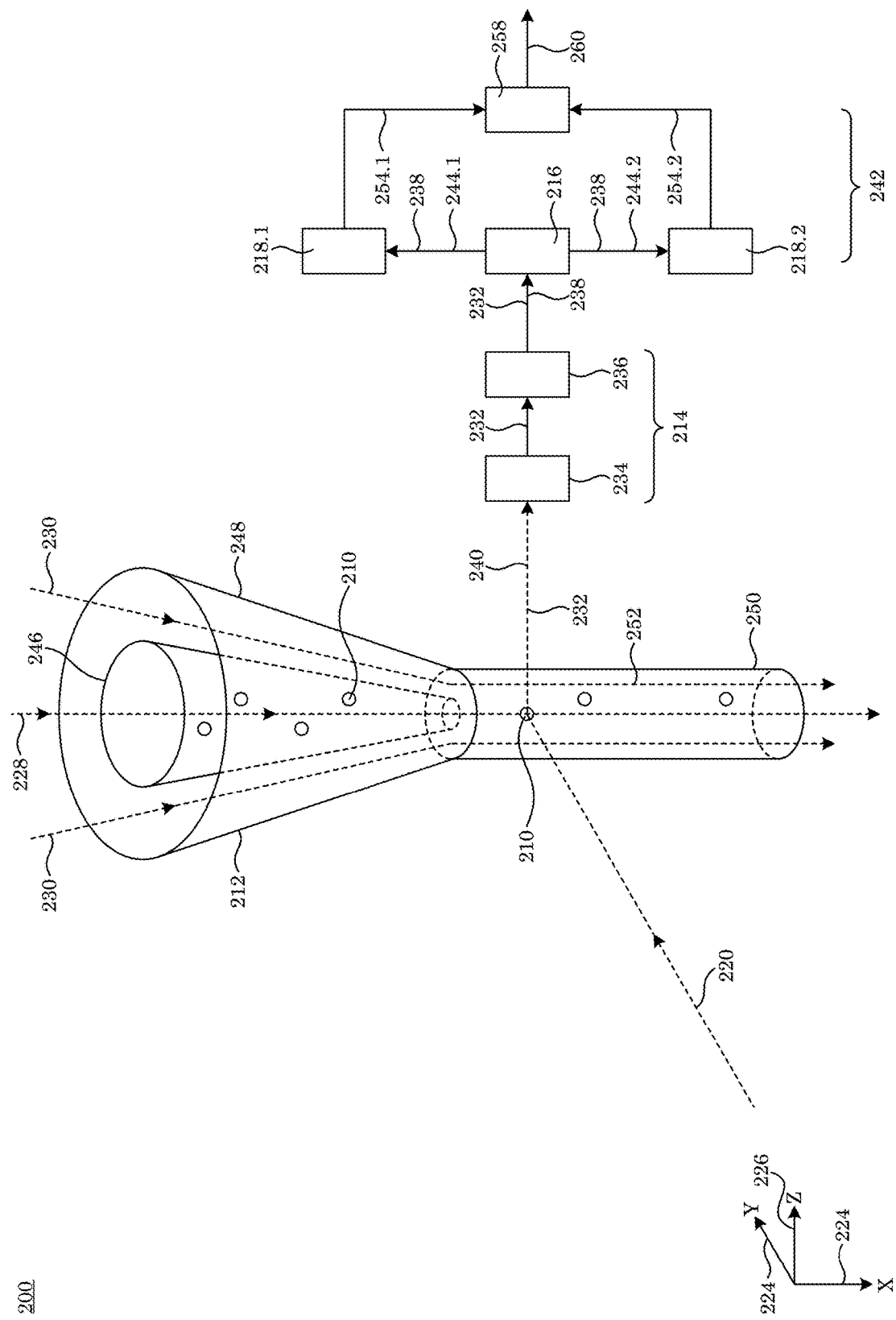
FIG. 3 shows a perspective view of the quantum flow cytometer shown in FIG. 2.

In another embodiment, with reference to FIG. 2 and FIG. 3, quantum flow cytometer 200 includes flow cytometer 212 that receives pump light 220 in first direction 222; receives analyte flow 228 including analyte 210 in second direction 224; and produces scattered light 232 from scattering pump light 220 by analyte 210. Quantum flow cytometer 200 also includes intensity interferometer 242 in optical communication with flow cytometer 212. Intensity interferometer 242 includes one or more beam splitters 216 in optical communication with flow cytometer 212. Beam splitter 216 receives, in third direction 226, scattered light 232 from flow cytometer 212; and splits scattered light 232 into first scattered light beam 244.1 and second scattered light beam 244.2. If more than one beam splitter is used, the input of each subsequent beam splitter is optically connected to the output of a previous beam splitter 244, and the scattered light 232 is further subdivide into scattered light beams 244. In intensity interferometer 242, first single photon detector 218.1, which can be either a photon number resolving detector or non-photon number resolving detector, is in optical communication with beam splitter 216 and receives first scattered light beam 244.1 from beam splitter 216, and second single photon detector 218.2, which can be either a photon number resolving detector or non photon number resolving detector, is in optical communication with beam splitter 216 and receives second scattered light beam 244.2 from beam splitter 216. Here, beam splitter 216 and single photon detectors 218 provide a Hanbury Brown-Twiss (HBT) effect for detection of analyte 210. It is contemplated that first direction 222, second direction 224, and third direction 226 are arranged at oblique angles to one another.

Light source 256 can provide pump light 220. Light source 256 can be a laser, a frequency doubler, an optical amplifier, a parametric light converter, light-emitting diode, a lamp including a gain medium, heating elements or other sources of energy to produce coherent or incoherent, pulsed or continuous-wave light. Such includes quantum sources of light with exotic photon number statistics such as a photon pair source, squeezed vacuum, and squeezed coherent state sources for multiphoton absorption in analyte 210 with lower pump power and to enhance a signal-to-noise ratio. Exemplary light sources 256 include diode lasers, optically pumped Ti: Sapphire lasers, Argon ion lasers, parametric frequency doublers, and optical parametric oscillators. Moreover, incoherent sources of pulsed or continuous radiation can be used. In an embodiment, light source 256 includes a pulsed femtosecond Ti: Sapphire laser at 900 nm whose light is frequency doubled to provide input light 220 at 450 nm.

Pump light 220 can include incoherent or coherent radiation and can be either pulsed or continuous-wave to optically excite analytes 210. A wavelength of pump light 220 can be from 4000 nm to 300 nm, specifically from 800 nm to 300 nm to produce single-photon excitations, from 3500 nm to 550 nm to produce multiphoton excitations, and more specifically from 550 nm to 400 nm to use with fluorophores excite fluorescence with an optical single photon excitation. A temporal pulse width of pump light 220 can be from 5 attoseconds (as) to continuous wave, specifically from 5 fs to 10 ns, and more specifically from 500 fs to 5 ps. An average power of pump light 220 can be from 1 fW to 100 W, specifically from 1 microwatt (uW) to 1 W, and more specifically from 1 mW to 100 mW. A repetition rate of pump light 220 can be from 0.001 mHz to 100 GHz or continuous wave, specifically from 1 Hz to 1 GHz and more specifically from 1 MHz to 100 MHz. As used herein, "average power" refers to averaged instantaneous power of the laser over many (e.g., 100 or more) pulses or time-averaged power of a continuous wave radiation over 1 ms or longer. In an embodiment, pump light 220 includes a pulsed laser with the wavelength of 450 nm, pulses of approximately 1 ps, repetition rate of 76 MHz and average power of 5 mW produced from a Ti: Sapphire laser with the wavelength of 900 nm, average power of 1.5 W, pulses of approximately 2 ps, and repetition rate of 76 MHz.

Flow cytometer 212 receives analyte flow 228 and sheath flow 230 and hydrodynamically focuses analyte flow 228 in flow column 252 surroundingly sheathed by sheath flow 230 in confluence tube 250. Flow cytometer 212 can include a flow cell or a microfluidic cell to channel the analyte flow 228 and sheath flow 230 and establish the optical access for the excitation beam 220 and the scattered light 232 and can be a rectangular parallelepiped glass with polished sides and a rectangular polished through hole with tapered dimensions inside. Exemplary flow cytometers 212 include a rectangular parallelepiped flow cell with approximate dimensions of 4 mm×5 mm×15 mm, a rectangular hole with dimensions of 250 um×250 um through its longest dimension. Moreover, the hole can be tapered from one end with a largest dimension at the surface of 0.5 mm×0.5 mm to focus analyte flow 228 in sheath flow 230. In an embodiment, flow cytometer 212 includes two independent pumps, one to push the syringe with the analyte flow 228 and the other to push sheath flow 230.

Sheath flow 230 flows in sheath flow tube 248 and merges with the analyte flow at confluence tube 250. Sheath flow 230 can include water, saline fluid, organic solvent that provides an external flow to the analyte flow for hydrodynamic focusing. Sheath flow 230 can be provided by a syringe controlled by a syringe pump. A flow rate of sheath flow 230 can be from 0 microliter (uL)/min to 100000 uL/min, specifically from 0.01 uL/min to 1000 uL/min, and more specifically from 0.1 uL/min to 100 uL/min. The flow rate can be controlled to remain in laminar flow in flow cytometer 212.

Analyte flow 228 flows in inner flow tube 246 and merges with sheath flow 230 at confluence tube 250. Analyte flow 228 can include an analyte that includes biological cells, peptides, or antigens that include appropriate fluorescent labels, at least one per biological entity of interest to produce optical signal upon optical excitation and can be quantum-dot-labeled organic molecules mixed with water, saline solution or organic solvent. Analyte flow 228 can be produced from a syringe with a syringe pump. A flow rate of analyte flow 228 can be from 0 uL/hour to 1000 uL/hour, specifically from 0.001 uL/hour to 100 uL/hour, and more specifically from 0.1 to 10 uL/hour. Moreover, a ratio between analyte flow rate and sheath flow rate can be maintained at a selected value for laminar flow and selected dimensions of hydrodynamic focus.

Analyte 210 is disposed in analyte flow 228. Analyte 210 can include biological cells, peptides, or antigens that include appropriate fluorescent labels, e.g., one per biological entity of interest to produce optical signal upon optical excitation and can be organic dye-labeled organic molecules or quantum-dot-labeled organic molecules mixed with water, saline solution or organic solvent. Exemplary analytes 210 include colloidal quantum dots dissolved in an inorganic solvent, e.g., in water, or organic solvent, e.g., decane. Moreover, to achieve enumeration, each biological entity can be labeled by a number of fluorescent labels, e.g., by one such label. In an embodiment, analyte 210 includes quantum dots with a biotin-binding protein such as streptavidin that can be covalently attached to a fluorescent label for attachment to biological entities.

In confluence tube 250 analyte 210 is subjected to pump light 220 and produces scattered light 232. Scattered light 232 can include photons due to fluorescence, photons due to Raman and elastic scattering, or noise photons that can be collected for subsequent detection and analysis. A temporal pulse width of scattered light 232 can be from 0 s to 1 s, specifically from 1 fs to 100 us, and more specifically from 100 ps to 100 ns. A wavelength of scattered light 232 can be from 200 nm to 4000 nm, specifically from 350 nm to 2000 nm, and more specifically from 350 nm to 1000 nm. An average power of scattered light 232 can be from 0 mW to 100 mW, specifically from 0 W to $2*10^{-10}$ W, and more specifically from 0 W to $5*10^{-12}$ W. In an embodiment, scattered light 232 includes photons at the range of wavelengths from 350 nm to 1000 nm that originate from different processes such as fluorescence, Raman scattering, elastic and inelastic scattering and has energy per pulse of 0 J to $5*10^{-17}$ J. The temporal length of the pulse depends on the fluorophores and conjugation methods use, and pump temporal length and can be from 0 s to 100 ns.

Scattered light 232 can include Raman scattering background light 240 that can have a wavelength from 200 nm to 4000 nm, specifically from 350 nm to 2000 nm, and more specifically from 350 nm to 1000 nm. An average power of Raman scattering background light 240 can be from 0 mW to 100 mW, specifically from 0 W to $2*10^{-10}$ W, and more specifically from 0 W to $5*10^{-17}$ W. In an embodiment, Raman scattering background light 240 includes photons at the range of wavelengths from 350 nm to 1000 nm and has energy per pulse of 0 J to $5*10^{-17}$ J. The temporal length of the pulse of scattered light 232 depends on pump temporal length is co-temporal with the pump pulse and can be from 500 fs to 2 ns.

Scattered light 232 is received by light collector 214 from confluence tube 250. Light collector 214 can include focusing lenses, microscope objectives, optical filters, single mode and multi-mode optical fiber to collect, filter and route the scattered light 232 to a light detector and can be a confocal microscope. Exemplary light collectors 214 include high numerical aperture lenses, multimode optical fiber and optical filters based on wavelength selection. Moreover, the light collector is assembled with minimal light losses due to possible surface reflection by using broad optical coating surfaces that best transmit the light of expected wavelength. In an embodiment, light collector 214 includes a 0.5 numerical aperture aspheric lens, a set of band-pass filters that only transmit light of wavelengths expected from the fluorophore used, e.g., a 50 nm-wide bandpass centered around 655 nm, and a coupling aspheric lens with a numerical aperture matched to that of the fiber.

Lens 234 can reduce aberrations and anti-reflection coated to transmit light at 655 nm wavelength and can be a microscope objective or evanescently coupled waveguide or shaped tip of the waveguide or fiber. In an embodiment, lens 234 includes aspheric lens coated for 600-1050 nm. A number of lenses can be selected for collimation and the like.

Filter 236 can include dichroic mirrors, low-pass optical filters, high-pas optical filters, notch filters with one or many pass-bands and a combination thereof to filter by wavelength selection an optical signal including optical pump residual and Raman scatter and can be thin-film deposited optical wavelength filters or volume Bragg gratings or colored glass. Exemplary filters 236 include thin-film deposited optical wavelength filters. Moreover, peak absorption or reflection bands of the filters should be spectrally overlapped with the wavelengths of peak scattering activity, such as Raman resonances of water and solvents, pump wavelength and its second harmonic. In an embodiment, filter 236 includes a set of thin-film filters with combined optical density of ~8 to >12 to block the unwanted light and combined transmittance of ~90% in the wavelength region of interest.

Optical path 238 receives scattered light 232 from light collector 214. Optical path 238 can include fiber coupling optics, a single or multimode optical fiber or a free-space link to the detector to route collected light to a detector 218 or beam splitter 216. Exemplary optical path 238 include connectorized fiber patch cords. Moreover, length of fiber or a free space link must be sufficiently short to avoid propagation losses. In an embodiment, optical path 238 includes a connectorized multimode patch cord 2 meters in length.

Photon-number resolved detector 218 can include a superconducting transition-edge sensor detector or an interleaved superconducting nanowires that generate electrical signal upon photon arrival and absorption in such a way that the analysis of that electrical signal can discriminate between none, one, two, and a few photons with enumeration. The arrival times could be derived from the temporal dependence of the output electrical signal as leading edges. The photon number can be obtained from peak amplitude or integral amplitude of the electrical pulses or as digital information. In an embodiment, the detector 218 can be a superconducting transition edge sensor or a visible-light photon counter, or an interleaved superconductor nanowire single photon detector.

The analyzer 258 electrically connected to photon-number resolved detector can include an amplitude to digital coder, and a processing unit such as a field programmable gate array (FPGA) or a microprocessor. The processing unit should be arranged to extract number of photons from the signal 254 produced by detector 218 and calculate second, third or higher order correlation of photon arrivals.

In another embodiment, beam splitter 216 receives scattered light 232 from optical path 238. Beam splitter 216 can include fiber beam splitters, fiber pigtailed beam splitters, or free space beam splitters to split the collected scattered light 232 into secondary scattered light beams 244. Moreover, several beam splitters can be used one after another to further split the scattered light in multiple paths 244 for subsequent detection and correlation analysis. In an embodiment, beam splitter 216 includes a fiber beam splitter with a splitting ratio close to 50%/50%.

Single photon detectors 218.1 and 218.2 receive scattered light beams 244.1 and 244.2 correspondingly from beam splitter 216. Single photon detectors 218.1 and 218.2 can include avalanche photodiode in a photon detection mode, superconducting nanowire single photon detector, single-photon sensitive camera, or a photomultiplier tube. Each of detectors 218.1 and 218.2 should provide an electrical pulse upon detection of a photon with a rising edge that contains information about arrival time of the photon at the detector. In an embodiment, single photon detectors 218.1 and 218.2 include a thick avalanche photodiode.

Scattered light beams 244.1 and 244.2 can include optical photons emitted in the flow cytometer 212 by optical processes such as Raman scattering and fluorescence. A temporal pulse width and wavelengths of scattered light beams 244.1 and 244.2 can be the same as that of scattered light 232. An intensity of scattered light beams 244.1 and 244.2 can be proportional to that of scattered light 232, albeit the coefficient of proportionality is lower than unity. In an embodiment, scattered light beams 244.1 and 244.2 have the same optical characteristics as scattered light 232, except for energy of optical pulses. The energy of optical pulses is proportional to and approximately 50% of the energy of scattered light pulses.

In response to detecting scattered light beams 244.1 and 244.2, single photon detector 218.1 and 218.2 produce detection signals 254.1 and 254.2. Detection signals 254.1 and 254.2 can include digital electronic pulses whose leading edge reflects the information about arrival time of corresponding optical photons from the light beams 244.1 and 244.2. A temporal pulse width of detection signals 254.1 and 254.2 can be from 0 s to 1 s, specifically from 1 ps to 1 ms, and more specifically from 1 ns to 100 ns. An amplitude of detection signal 254 can be from 0V to 10000V, specifically from 0.01 uV to 100V, and more specifically from 1 uV to 10V, and can have rectangular shape. If detection signal has amplitude that an analyzer logic cannot directly detect signal, the voltage can be increased by an analog amplifier or digital comparator. In an embodiment, detection signal 254 is a rectangular pulse that is approximately 2V in amplitude and 25 ns in duration.

Detection signal 254 is received by analyzer 258 from single photon detectors 218 after optional amplification or a digital comparator. Analyzer 258 can include a microprocessor or an FPGA to digitally process the temporal characteristics of the signal and compute second, third, or higher order correlation function of the detection signal 254. Alternatively, temporal records of leading edge pulse arrivals from the detection signal 254 can be measured and stored on a computer for further processing using the same or other personal computer. In an embodiment, analyzer 258 includes an electronic time tagger that records times of arrival of the electronic pulses, stores them on a hard disc drive and computes correlation functions at a later time.

Analyzer 258 produces quantum cytometer signal 260 from detection signals 254. Quantum cytometer signal 260 can include photon number resolved rates and correlations as a function of time from the beginning of the optical excitation via pump light 220 and time intervals between detections, known as number of counts at a given time interval and time-dependent correlation functions. In most general case with pulsed optical excitation 220 the pulse number p can be used as an enumerator. Moreover, for each detected photon, detection time of a photon on one of the detectors 218 labeled i, occurs at time of $p_i$ pulse with the temporal offset $t_i$ from the beginning of the pulse $p_i$. Then, average n-order correlations can be computed as $C(n)(t_1, t_2, \ldots, t_n, d_t, p_2-p_1, p_3-p_1, \ldots, p_n-p_1)$. To obtain $C(n)$, continuous times $t_i$ break into temporal bins of duration dt. Then $t_i$ are relabeled such that $t_{i,new}$=floor($t_i$/dt), floor(x) denotes finding a nearest integer that is less than or equal to the argument x. From this point on, only $t_{i,new}$ are used and index "new" is dropped. Of the highest interest is $C(n)(0)$ defined as $C(n)(0)=C(n)(t_1, t_2, \ldots, t_n, dt, 0, 0, \ldots 0)$, which describes correlations within the same pump pulse. $C(n)$ can be normalized with either computed probabilities of random coincidences between photon arrival times or by using averaged values of $C(n)$ with sufficiently large $p_2-p_1$, $p_3-p_1$, $\ldots p_n-p_1$ such that no correlations between arrival times of photons occurs in practice. Finally, normalized $g(n)(t_{start}, dt, p_2-p_1, p_3-p_1 \ldots p_n-p_1)$ is computed such that all detections whose detection delays at all detectors $t_i$ fall into the interval $[t_{start}, t_{start}+dt]$ are added and then normalized by the number of expected uncorrelated coincidence detections that would occur within the time interval $[t_{start}, t_{start}+dt]$. A series of observed cross correlation functions are calculated to find instances where the functions deviate from unity. A temporal quantum cytometer signal 260 can be a one-dimensional function of average rates of photon detection versus elapsed time from the beginning of the excitation pulse 220.

Further, process for making quantum flow cytometer 200 includes analysis of quantum cytometer signal 260. The measured time-resolved correlation functions are screened for values statistically different from unity. Because uncorrelated noise is statistically different from correlated signal from individual fluorophores within analyte 210, quantum cytometer signal 260 is evaluated for regular temporal regions where correlation functions significantly deviate from unity. Such temporal regions repeat regularly after each excitation pulse. Particularly, quantum signal from few fluorophores is detected when correlation function of any order gets significantly below unity. That signal may contain residual uncorrelated background, but its influence can be avoided by measuring the part of correlations that are specifically due to uncorrelated background. To do so, one either analyzes higher-order correlations or observes quantum signal 260 from analyte flow 228 with a range of analyte 210 concentrations. Specifically, for uncorrelated optical and electronic dark count noise correlated signal from the analyte can be determined. The signal, collection efficiency, and concentration can be determined in situ to relate photon flux per unit time to the number of fluorophores.

Figure 7:
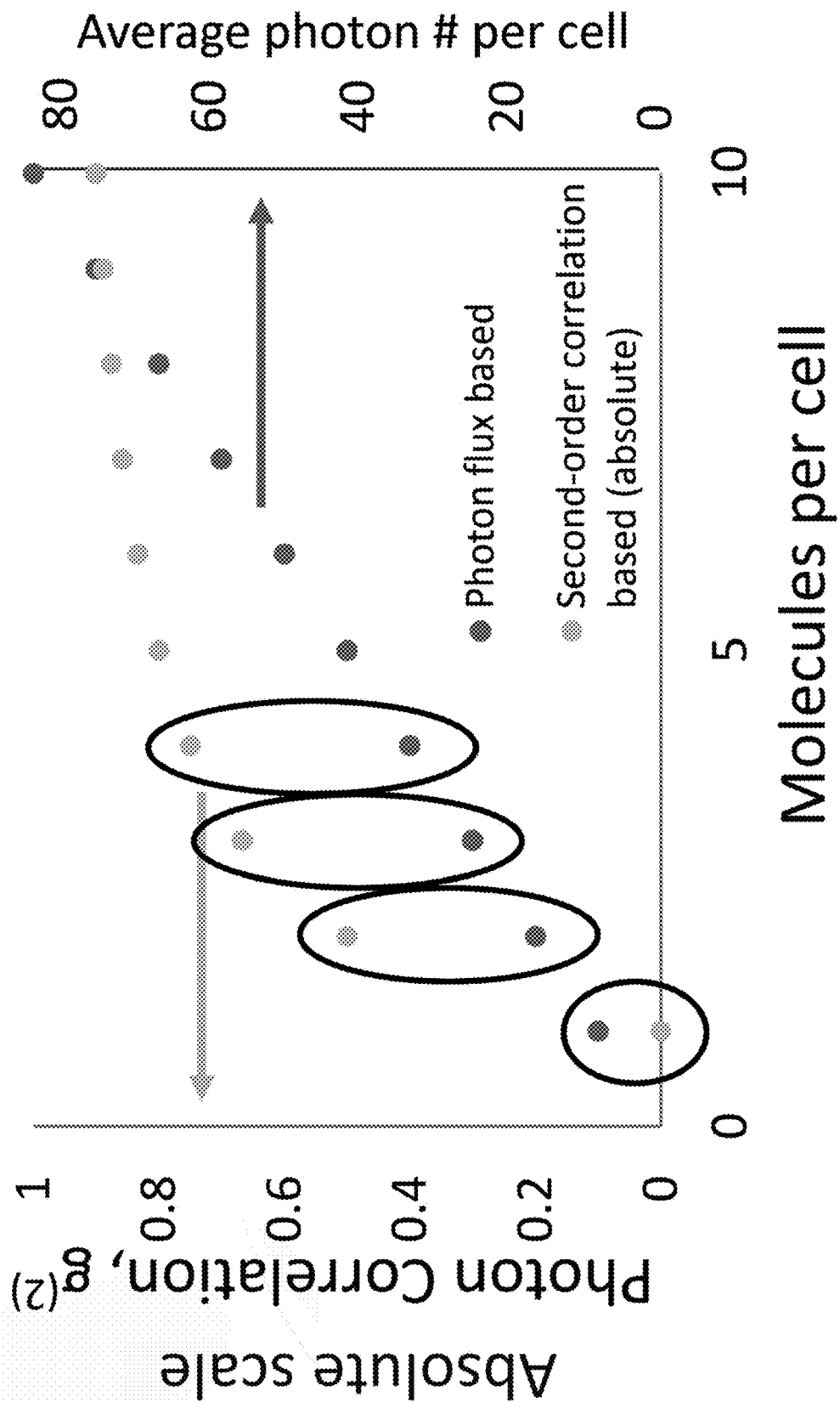
FIG. 7 shows a graph of photon correlation and average photon number per cell versus the number of fluorescent molecules per cell.

To identify the number of fluorophores in the absolute way, photon number statistics can be used. Photon number statistics can be measured using the quantum cytometer signal 260. For instance, the second-order photon number statistics with no background present gives the number of fluorophores in a given analyte entity directly, $g(2)=1-1/N$, where N is the number of fluorophores in a given analyte entity, illustrated in FIG. 7. In case when background is present, the background should be characterized via a calibrating procedure described later in the example.

Quantum flow cytometer 200 can be made in various ways. In an embodiment, a process for making quantum flow cytometer 200 includes connecting inner flow tube 246 of flow cytometer 212 to a source of analyte flow 228; connecting sheath flow tube 248 of flow cytometer 212 to a source of sheath flow 230; disposing confluence tube 250 of flow cytometer 212 in optical communication with light source 256 for receipt of pump light 220 by analyte 210 in confluence tube 250; disposing confluence tube 250 in optical communication with light collector 214; providing lens 234 and filter 236 in light collector 214 to receive scattered light 232 from confluence tube 250; disposing light collector 214 in optical communication with beam splitters 216 and photon detectors 218 via optical path 238; and electrically connecting photon detectors 218 with analyzer 258.

In an embodiment, the process for making quantum flow cytometer 200 also includes omission of light collector 214.

The process for making quantum flow cytometer 200 also can include the above steps, except that beam splitter 216 and single photon detectors 218.1, 218.2 . . . can be replaced by a single photon-counting detector 218 in optical communication with optical output 232 via optical path 238; and electrically connecting single photon-counting detector 218 with analyzer 258.

Quantum flow cytometer 200 has numerous advantageous and unexpected benefits and uses. In an embodiment, a process for detecting analyte 210 with photon-number statistics with the quantum flow cytometer 200 includes: receiving, by flow cytometer 212, pump light 220 in first direction 222; receiving, by flow cytometer 212, analyte flow 228 including analyte 210 in second direction 224; producing, by analyte 210, scattered light 232 from scattering pump light 220; receiving, by a photon number resolving detector 218, scattered light 232; producing, by photon number resolving detector 218, detection signal 254 in response to detecting scattered light beam 232; and subjecting detection signal 254 to an analyzer 258 to detect analyte 210 by analyzing the number of detected photons and their photon number statistics, wherein first direction 222, second direction 224, and third direction 226 are arranged at oblique angles.

Quantum flow cytometer 200 has numerous advantageous and unexpected benefits and uses. In an embodiment, a process for detecting analyte 210 with photon-number statistics with the quantum flow cytometer 200 includes: receiving, by flow cytometer 212, pump light 220 in first direction 222; receiving, by flow cytometer 212, analyte flow 228 including analyte 210 in second direction 224; producing, by analyte 210, scattered light 232 from scattering pump light 220; receiving, by beam splitter 216, scattered light 232 in third direction 226 from flow cytometer 212; splitting, by beam splitter 216, scattered light 232 into first scattered light beam 244.1 and second scattered light beam 244.2; detecting, by first single photon detector 218.1, first scattered light beam 244.1 from beam splitter 216; producing, by first single photon detector 218.1, first detection signal 254.1 in response to detecting first scattered light beam 244.1; detecting, by second single photon detector 218.2, second scattered light beam 244.2 from beam splitter 216; producing, by second single photon detector 218.2, second detection signal 254.2 in response to detecting second scattered light beam 244.2; and subjecting first detection signal 254.1 and second detection signal 254.2 to an analyzer 258 to detect analyte 210 by analyzing the number of detected photons and their photon number statistics, wherein first direction 222, second direction 224, and third direction 226 are arranged at oblique angles.

In the process for detecting analyte 210 with the quantum flow cytometer 200, receiving, by flow cytometer 212, pump light 220 in first direction 222 includes generating pulsed or continuous wave light with a light source for a selected wavelength and pulse duration and focusing pump light 220 on a flow cytometer 212 such that the focus coincides with the geometrical center of the analyte flow 210.

In the process for detecting analyte 210 with the quantum flow cytometer 200, receiving, by flow cytometer 212, analyte flow 228 including analyte 210 in second direction 224 includes determining the flow rate for the analyte pump and for the sheath pump to establish stable laminar flow of selected analyte cross-section.

In the process for detecting analyte 210 with the quantum flow cytometer 200, producing, by analyte 210, scattered light 232 from scattering pump light 220 includes collecting light from the region of analyte flow 228 at a focal point of pump light 220 with a selected fraction of solid angle and optically connecting scattered light with a single photon number resolving detector or a detector tree with lenses, filters, fiber and beam splitters.

In the process for detecting analyte 210 with the quantum flow cytometer 200, receiving, by beam splitter 216, scattered light 232 in third direction 226 from flow cytometer 212 includes aligning pump beam 220, analyte flow 228 and, optionally light collector 214 and detectors 218 to detect signal.

In the process for detecting analyte 210 with the quantum flow cytometer 200, splitting, by beam splitter 216, scattered light 232 into first scattered light beam 244.1 and second scattered light beam 244.2 includes selecting a beam-splitter such that the splitting ratio is nearly constant for the wavelength range of interest.

In the process for detecting analyte 210 with the quantum flow cytometer 200, detecting, by photon number resolving detector 218, scattered light beam 232 from beam splitter 216 includes mutual alignment of light beam 232 and detector 218.

In the process for detecting analyte 210 with quantum flow cytometer 200, producing, by photon number resolving detector 218, detection signal 254 in response to detecting scattered light beam 232 includes establishing normal operating conditions for detector 218 and amplifying its output signal with a comparator or analog amplifier so that detection signal 254 can be processed by analyzer 258.

Alternatively, in the process for detecting analyte 210 with quantum flow cytometer 200, detecting, by first single photon detector 218.1, first scattered light beam 244.1 from beam splitter 216 includes mutual alignment of light beam 244.1 and detector 218.1.

Alternatively, in the process for detecting analyte 210 with the quantum flow cytometer 200 producing, by first single photon detector 218.1, first detection signal 254.1 in response to detecting first scattered light beam 244.1 includes establishing operating conditions for detector 218.1 and amplifying an output signal with a comparator or analog amplifier so that detection signal 254.1 can be processed by analyzer 258.

Alternatively, detecting, by second single photon detector 218.2, second scattered light beam 244.2 from beam splitter 216 includes mutual alignment of light beam 244.2 and detector 218.2.

Alternatively, producing, by second single photon detector 218.2, second detection signal 254.2 in response to detecting second scattered light beam 244.2 includes establishing operating conditions for detector 218.2 and amplifying the output signal with a comparator or analog amplifier so that detection signal 254.2 can be processed by analyzer 258.

In the process for detecting analyte 210 with quantum flow cytometer 200, subjecting detection signal 254 or, alternatively, first detection signal 254.1 and second detection signal 254.2 to an analyzer 258 to detect analyte 210 includes calculating time-resolved cross-correlations considering temporal location of detection signals 254.1 and 254.2 with respect to the closest optical pump 220 pulse.

The process for detecting analyte 210 with quantum flow cytometer 200 also can include measuring single photon arrival times and wavelengths within regions of interest that are established with the help of the correlation measurement on a diluted analyte when approximately the average number of fluorophores within the volume from which the scattered light 232 is collected is around one, and selecting those regions where correlation function g(2) is minimal. In this way the uncorrelated background is reduced.

The process for detecting analyte 210 with the quantum flow cytometer 200 can also include absolute self-calibration to relate photon flux of the collected scattered light 232 to the number of fluorophores under measurement. To perform self-calibration, a given initial concentration of analyte in the sample flow 228 is achieved through dilution of the analyte 210 in an organic or inorganic solvent. This concentration can be unknown. Several concentrations of analyte 210 are prepared from the initial concentration of analyte 210 by further dilution in a solvent, where this further relative dilution factors need to be known. The quantum cytometer signal 260 is obtained for several analyte flows 228 with different dilutions of analyte 210 using the constant parameters of the pump light 220, and the same position of the optical path 238 relative to scattered light 232, light collector 214 (if present), and keeping same alignment and operating conditions of the detectors 218, sheath flow 230, and analyte flow 228. Instead of using a plurality of dilutions for the analyte flow 228, only one initial dilution may be used, and a plurality of measurements may be taken with different flow rates of analyte flow 228 and sheath flow 230. A model that predicts the energy per pulse of scattered light 232 with changing analyte concentrations or flow parameters can be derived. An example of such a model under assumption that an optical scattered light 232 consists of light from few fluorophores and uncorrelated background is presented below in the Example.

Quantum flow cytometer 200 and processes disclosed herein have numerous beneficial uses, including first-principle based noise elimination, absolute self-calibration, and increased sensitivity. Advantageously, quantum flow cytometer 200 overcomes limitations of technical deficiencies of conventional articles such as low specificity of observed signal and poor correlation between the number of fluorophores and detected optical signal when only a few (~10 or fewer) fluorophores are used per biological entity.

Quantum flow cytometer 200 provides sensitivity and specificity that exceeds that of conventional flow cytometer technology, wherein saturation is reached and after which further increase in sensitivity does not result in improved specificity. Quantum flow cytometer 200 enumerates biological targets, such as antibodies, micro RNA, exosomes and the like at low concentrations and provides an absolute scale for such enumeration in situ with inter-comparability of among samples. Accordingly, quantum flow cytometer 200 overcomes conventional problems of calibration of flow cytometers for intercomparing and quantification. Moreover, use of calibration information from quantum flow cytometer 200 optimizes sensitivity in real-time cell-to-cell measurement at a level of a single fluorophore. Light produced by a system of few optically active biomarkers (fluorescent molecules, quantum dots, color centers in nanocrystals and the like) exhibits quantum behavior, and quantum flow cytometer 200 detects such via quantum measurement. Here, photon number statistics unambiguously resolves the number of emitters and is resilient to loss. This unambiguous measurement provides self-calibration of flow cytometer 212 in quantum flow cytometer 200. A sample of an unknown concentration of fluorophores diluted by a selected factor provides a range of concentrations with an average of fluorophores from approximately 0.1 (or lower) to approximately 10 per interrogation volume. Quantum flow cytometer 200 acquires photon number statistics for each of diluted samples. A continuous wave laser or pulsed laser can be used to optically excite the fluorophores. In addition to absolute calibration, time-resolving statistical analysis identifies temporal properties of signal (nonclassical) and noise (classical). Although conventional instruments collect signal from a biological entity for a short time microseconds to a millisecond with a number of collected photons from trace concentrations of biomarkers being, limited, quantum flow cytometer 200 overcomes such limitations and separates signal from background due to accurate time of single photon detection being collected with temporal properties of signal and noise independently identified, wherein separation of signal from background can be made sub-shot noise.

Moreover, quantum flow cytometer 200 and processes herein have numerous advantageous properties. In an aspect, quantum signal 260 can be used together with conventional classical signals from classical detectors providing for measurement of several different types of analyte simultaneously or to improve overall specificity. Examples of such use include triggering the collection of the quantum cytometer signal upon detecting a certain signal within scattered light 232, correlation of classical signal with quantum cytometer signal and the like. The classical signal can be obtained with the same or different pump light beam 220. Further, the classical signal can be obtained with the arbitrary wavelength and temporal region of interest. Further, the classical signal can be obtained in the same or different direction than directions 222, 224, and 226. Classical signal can originate from any physically allowed interaction of pump light 220 with the same or different or combined analyte 210, for instance from scattering, fluorescence and Raman scattering. Classical signal can be detected by any light detector, such as a photodiode, an avalanche photodiode, a photomultiplier tube and a single-photon detector. A difference between classical signal and quantum signal is that with classical signal no quantum correlation is expected or measured.

Moreover, quantum flow cytometer 200 can be combined with another quantum flow cytometer that may be using the same or different pump light 220, measuring same or different scattered light 232, and measure that light in the same or different wavelength or temporal region of interest, providing for measurement of several different types of analyte simultaneously or to improve overall specificity. The quantum cytometer outputs 260 can be correlated or the presence of a particular feature in one output can trigger the measurement of the other.

Quantum flow cytometer 200 and processes herein unexpectedly provides the means for absolute calibration and enumeration of the number of fluorophores per biological entity by observing the photon detections. Moreover, quantum flow cytometer 200 provides signal-to-noise optimization from first principles.

The articles and processes herein are illustrated further by the following Example, which is non-limiting.

EXAMPLE

Absolute measurement of biomarker concentration with sensitivity for detecting a single biomarker is accomplished by a quantum flow cytometer. As a mimic for a biological analyte, a colloidal quantum dot is used. It should be appreciated that flow cytometry is a powerful optical method used in diagnosis of health disorders and disease monitoring. The quantum flow cytometer receives light that optically excites single biological entities such as cells having attached a fluorescent biomarker, wherein the light can be from a laser. Emitted light is assessed with photon-number statistics.

Discrimination of a cell containing a single desired biomarker is detected with the quantum flow cytometer. Low concentrations of biomarkers and faint levels of fluorescent light are handled by quantum measurement. Light produced from an analyte in a hydrodynamically focused analyte flow is subjected to pump light, wherein few optically active emitters including a fluorescent molecule, quantum dot (QD), and the like exhibits quantum behavior. The quantum flow cytometer unambiguously resolves the number of emitters in the analyte flow by a cross-correlation function of emitted photons in a photon-number resolving detection arrangement that is resilient to loss. By virtue of this unambiguous measurement, the quantum flow cytometer provides self-calibration of the flow cytometer through quantum statistics of detected photons as scattered light so that the quantum flow cytometer delivers absolute quantification and a verification that the sensitivity limit of one biomarker is achieved. Third and higher-order correlation functions exhibit their own unique dependence on analyte concentration and can be used to help measure or to verify absolute quantification in the presence of any optical noise.

Figure 4:
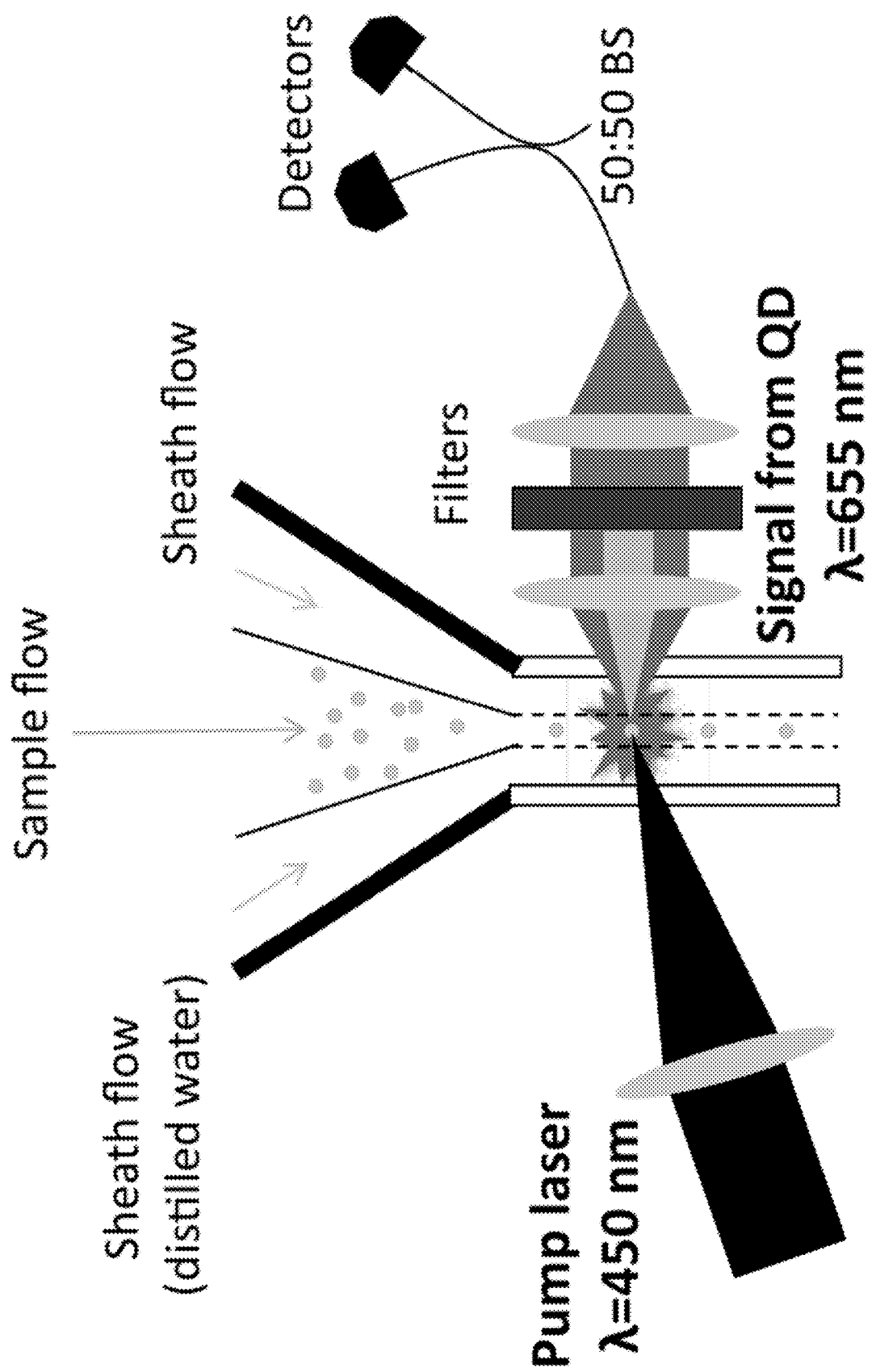
FIG. 4 shows a quantum flow cytometer.

The experimental setup is shown in FIG. 4, wherein hydrodynamic focusing confine a diluted biological material in a channel that has a 10-100 um diameter and surrounded by a sheath flow of distilled water. Single semiconductor nanocrystal quantum dots were used as analytes with an emission maximum at 655 nm. Pump light was provided as pulsed excitation by a second harmonic of Ti:Sapphire laser at 450 nm with a repetition rate of 76 MHz and approximate pulse duration of 1 ps. Scattered light is collected in a direction perpendicular to the pump laser beam with 0.5 NA aspheric lens and coupled to a multimode fiber. A low-pass filter at 488 nm rejects pump photons, and a 40 nm bandpass filter at 655 nm minimizes contamination of a signal with Raman scattering background. A primitive photon-number resolving photon detector (a Hanbury-Brown-Twiss setup) that includes a 50:50 beam splitter with a single photon avalanche diode in each of its output ports receives the scattered light.

In contrast to a continuous-wave pump laser source in a conventional flow cytometer, the quantum flow cytometer included a pulsed pump source. Ultrashort laser pulses lead to time dependence in re-emitted photons, providing an advantage in time-resolved light measurements. Particularly, Raman scattering from water molecules and fluorescence from the sample have different emission times and are distinguished by the detector.

Figure 5:
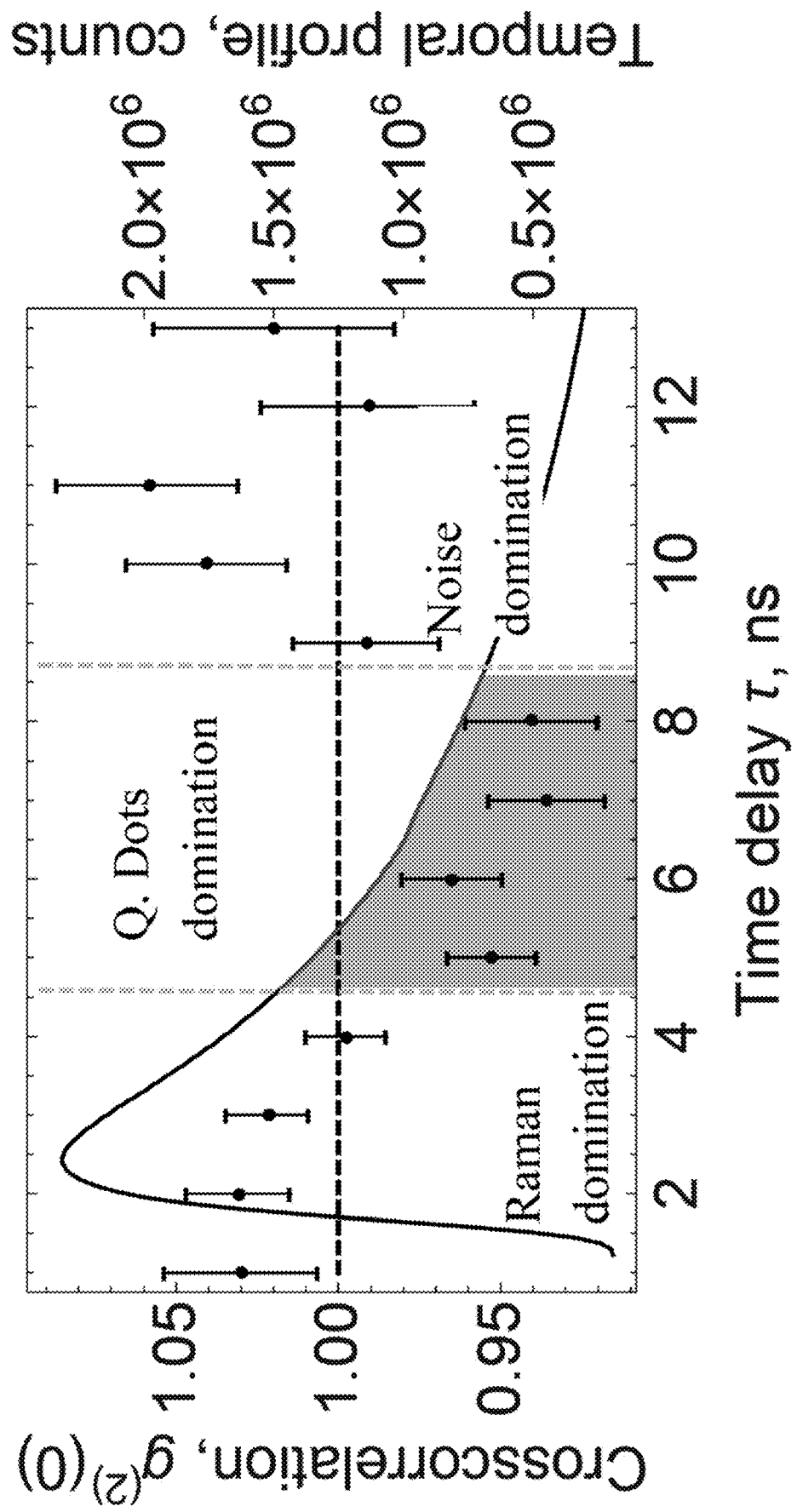
FIG. 5 shows a graph of cross-correlation versus time delay.

The biomarker is chosen so that its emission wavelength is detuned from the water Raman peak around 525 nm. Raman background is still present near the fluorescence peak. The pulsed pump source and different time dependence of Raman and fluorescent light is leveraged. Raman-scattered light decays faster than QD fluorescence so data may be rejected from early photon detection times, relative to pump pulse arrival. Single photon detectors have a non-negligible timing resolution also referred to as jitter. The three time-dependent processes are combined in the data. Temporal separation of fluorescence and Raman processes in the presence of jitter is seen in a time-dependent cross-correlation measurement because fluorescence from a few particles is anti-bunched, whereas multimode Raman light has Poisson statistics. A function, g(2) (t,dt,0), defined in [0037] is used, wherein t is a delay between the arrival of a pump pulse and the beginning of the region of interest, and dt=2 ns is the duration of the region of interest. This function is plotted against tin FIG. 5 and shows three intervals. At early times, detection is dominated by Poisson statistics due to Raman scattering. At medium times, emission from quantum dots takes dominance, and anti-bunching occurs. At long times, intensity of light emission decreases by more than an order of magnitude, and residual background dominates. The interval with the pronounced non-classical light statistics is used for further concentration analysis. In FIG. 5, a temporal profile of detected signal shows separation of Raman scattering and QD fluorescence based on measured time-resolved photon number statistics that is shown as circles with error bars.

Figure 6:
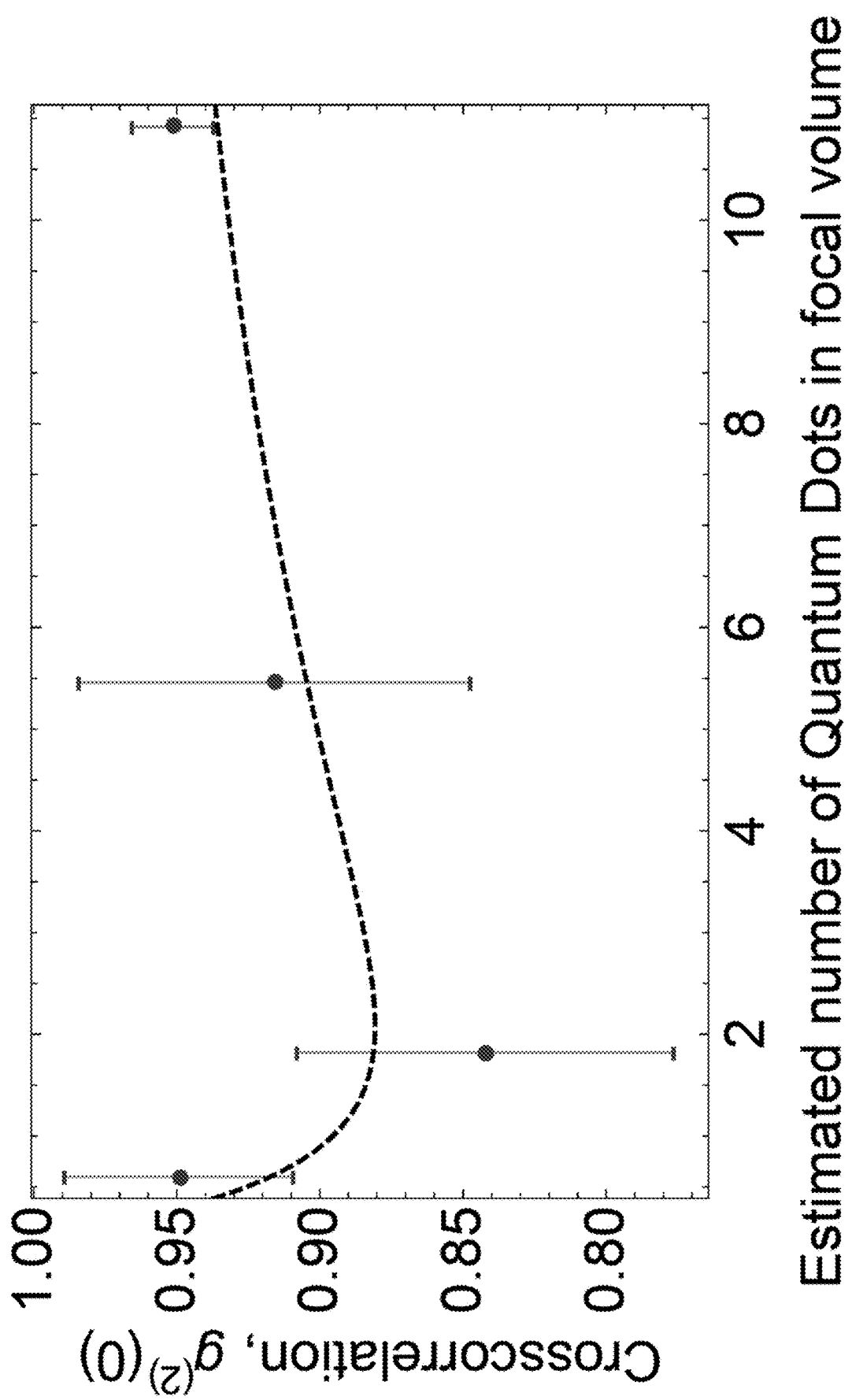
FIG. 6 shows a graph of cross-correlation versus estimated number of quantum dots in a focal volume.

QD concentrations are tested with the quantum flow cytometer such that the number of dots in the focal volume of the pump light is low. Non-classical behavior was observed in all these experiments. The nonclassical signal was used to assess the concentration by fitting the data to a model. The model assumes an unknown concentration of perfect single emitters supplemented with an unknown intensity of both Raman scattering and fluorescence. FIG. 6 shows a graph of cross-correlation versus estimated number of quantum dots in a focal volume for the best matching fit. The number of quantum dots in the focal volume is estimated using the model. Assumptions of the model can be replaced with an independent measurement for absolute calibration. Raman noise can be reduced or eliminated with a faster detector, more efficient filter, or two-photon excitation by the pump light. In FIG. 6, measured cross-correlations g(2)(t,dt,0) with t=5 ns and dt=4 ns (circles) were fit to a model (dashed line). The model can be that for second order correlations $$g^{(2)}(0)|_{\langle N \rangle} = \frac{2\left(\frac{1}{2}\langle N \rangle^2 p_q^2 \left(1 - \frac{1}{\langle N \rangle}\right) + \langle N \rangle p_q q_w + \frac{p_w^2}{2}\right)}{(\langle N \rangle p_q + p_w)^2}$$

so that an unknown concentration <N> which measures the average number of fluorophores in the volume from which scattered light 232 is collected, probability to get fluorescence photon $p_q$ from a single emitter and probability to get noise photon from the entire collection area $p_w$ are extracted from the fit. Importantly, probability to get a fluorescence photon from a given number of fluorophores in the collection area scales with <N> as shown in the model. The average number of quantum dots in focal volume, x-axis in FIG. 6 comes from the model, and error bars in FIG. 6 correspond to one standard deviation. In a series of calibrating experiments with different concentrations $<N_i>$, only ratios $<N_i>/<N_j>$ need to be known, but not the absolute concentrations. Therefore, starting from an unknown concentration <N> a series of $<N_i>$ can be obtained by dilution, and dilution factors need to be retained for analysis.

The quantum flow cytometer provides a nonclassical photonics measurement. The detection of single biomarkers in flow cytometry occurs with the quantum measurement that unambiguously verifies that the signal observed comes from a small number of optically active particles. Additionally, an absolute calibration for flow cytometers based on quantum properties of single emitters is provided. The QD biomarker binds with a variety of proteins, protein motifs, nucleic acids, and other molecules and can be used in flow cytometry so that a functionalized biomarker can be used to count biological entities by the numbers in a quantum-enabled flow cytometer.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, an "oblique angle" is any angle including, but not limited to right angle, zero angle, straight angle, acute angle and obtuse angle in a two-dimensional or three-dimensional space.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A quantum flow cytometer for detecting an analyte with photon-number statistics, the quantum flow cytometer comprising:
   a flow cytometer that:
      receives a pump light in a first direction;
      receives an analyte flow comprising the analyte in a second direction; and
      produces scattered light from scattering the pump light by the analyte;
   an intensity interferometer in optical communication with the flow cytometer and that comprises:
      a beam splitter in optical communication with the flow cytometer that:
         receives, in a third direction, the scattered light from the flow cytometer;
         splits the scattered light into a first scattered light beam and a second scattered light beam; and
      a first single photon detector in optical communication with the beam splitter and that receives the first scattered light beam from the beam splitter; and
      a second single photon detector in optical communication with the beam splitter and that receives the second scattered light beam from the beam splitter, such that the beam splitter and the single photon detectors provide a photon number statistics measurement that detects the analyte,
   wherein the first direction, the second direction, and the third direction are arranged at oblique angles, and the beam splitter splits light based on intensity of the scattered light according to a selected splitting ratio of the beam splitter so that the first scattered light beam and a second scattered light beam are subject to intensity interferometry by the intensity interferometer.

2. The quantum flow cytometer of claim 1, further comprising a light collector in optical communication with the flow cytometer and the intensity interferometer such that the light collector:
   is optically interposed between the flow cytometer and the beam splitter; and
   comprises:
      a lens that receives the scattered light from the flow cytometer;
      a filter that receives the scattered light from the flow cytometer and that reduces the pump light or Raman scattering background light from communication to the single photon detectors: and
      an optical fiber that receives the scattered light from the lens and the filter and communicates the scattered light to the beam splitter.

3. The quantum flow cytometer of claim 1, wherein the flow cytometer comprises:
   a sheath flow tube through which the sheath flow flows;
   an inner flow tube disposed in the sheath flow tube through which the analyte flow flows;
   a confluence tube in fluid communication with the sheath flow tube and the inner flow tube and in optical communication with the intensity interferometer such that the confluence tube:
   receives the sheath flow and the analyte flow;
   hydrodynamically focuses the analyte;
   constrains the flow of the analyte flow in a flow column within sheath flow in confluence tube;
   receives the pump light; and
   communicates the scattered light to the intensity interferometer.

4. The quantum flow cytometer of claim 1, wherein the single photon detector comprises a single photon avalanche diode.

5. The quantum flow cytometer of claim 1; wherein the analyte detected by the intensity interferometer is one molecule.

6. A process for detecting an analyte with photon-number statistics with the quantum flow cytometer of claim 1, the process comprising:
   receiving, by the flow cytometer, the pump light in the first direction;
   receiving, by the flow cytometer, the analyte flow comprising the analyte in the second direction;

producing, by the analyte, scattered light from scattering the pump light;

receiving, by the beam splitter, the scattered light in the third direction from the flow cytometer;

splitting, by the beam splitter, the scattered light into the first scattered light beam and the second scattered light beam, such that the beam splitter splits light based on intensity of the scattered light according to a selected splitting ratio of the beam splitter and so that the first scattered light beam and a second scattered light beam are subjected to intensity interferometry by the intensity interferometer;

detecting, by the first single photon detector, the first scattered light beam from the beam splitter;

producing, by the first single photon detector, a first detection signal in response to detecting the first scattered light beam;

detecting, by the second single photon detector, the second scattered light beam from the beam splitter;

producing, by the second single photon detector, a second detection signal in response to detecting the second scattered light beam; and subjecting the first detection signal and the second detection signal to an analyzer to detect the analyte by the photon number statistics, wherein the first direction, the second direction, and the third direction are arranged at oblique angles.

7. The process of claim 6 for detecting the analyte with photon-number statistics, further comprising:

performing, by the quantum flow cytometer, self-calibration.

8. The process of claim 7 for detecting the analyte with photon-number statistics, wherein performing self-calibration comprises:

sequentially and individually providing a plurality of samples as the analyte flow in the quantum flow cytometer, wherein the samples comprise:
a first composition comprising a first concentration of the analyte;
a second composition comprising a second concentration of the analyte, such that the first concentration is a known multiple of the second concentration.

9. The process of claim 8 for detecting the analyte with photon-number statistics, further comprising:

determining a noise, a concentration of the analyte, or a photon flux detected from a single fluorophore, or a combination comprising at least one of the foregoing parameters.

10. The process of claim 6 for detecting the analyte with photon-number statistics, further comprising:

setting a temporal area of interest for detection by the single photon detector based on a minimum in correlation obtained from the analyzer.

11. The process of claim 6 for detecting the analyte with photon-number statistics, further comprising:

flowing, through a sheath flow tube of the flow cytometer, the sheath flow; and flowing, through an inner flow tube disposed in the sheath flow tube, the analyte flow.

12. The process of claim 6 for detecting the analyte with photon-number statistics, further comprising:

receiving, by a lens, the scattered light from the flow cytometer;

receiving, by a filter, the scattered light from the flow cytometer, reducing, by the filter, an amount of the pump light or Raman scattering background light prior to communication of the scattered light to the single photon detectors; and receiving, by an optical fiber, the scattered light from the lens and the filter; and communicating, by the optical fiber, the scattered light to the beam splitter.

13. The process of claim 6 for detecting the analyte with photon-number statistics, further comprising:

flowing, through a sheath flow tube of the flow cytometer, the sheath flow;

flowing, through an inner flow tube disposed in the sheath flow tube, the analyte flow;

receiving, by a confluence tube, the sheath flow and the analyte flow;

confluence tube:

hydrodynamically focusing; by the confluence tube, the analyte flow;

constraining, in the confluence tube, analyte flow in a flow column within the sheath flow;

receiving, by the analyte flow in the confluence tube, the pump light;

producing, by the analyte in the confluence tube, the scattered light; and communicating the scattered light from the confluence tube to the intensity interferometer in the third direction.

14. The process of claim 6 for detecting the analyte with photon-number statistics, wherein a fluorophore is attached to the analyte, and producing, by the analyte, scattered light from scattering the pump light comprises emitting fluorescence from the fluorophore.

15. The process of claim 6 for detecting the analyte with photon-number statistics, herein the single photon detector comprises a single photon avalanche diode.

16. The process of claim 6 for detecting the analyte with photon-number statistics, wherein the analyte detected by the intensity interferometer is one molecule.

* * * * *